(12) United States Patent
Levy et al.

(10) Patent No.: US 10,423,013 B2
(45) Date of Patent: Sep. 24, 2019

(54) CLIP-ON SUNGLASSES

(71) Applicant: NAVAJO MANUFACTURING COMPANY, INC., Denver, CO (US)

(72) Inventors: Gordon Levy, Golden, CO (US); Hoi Kwan Wong, Thornton, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 61 days.

(21) Appl. No.: 15/804,393

(22) Filed: Nov. 6, 2017

(65) Prior Publication Data

US 2018/0129076 A1  May 10, 2018

Related U.S. Application Data

(60) Provisional application No. 62/417,871, filed on Nov. 4, 2016.

(51) Int. Cl.
*G02C 9/00* (2006.01)
*G02C 9/04* (2006.01)

(52) U.S. Cl.
CPC .................................... *G02C 9/04* (2013.01)

(58) Field of Classification Search
CPC . G02C 9/04; G02C 7/086; G02C 7/16; G02C 9/00

USPC ......................................... 351/47, 48, 57, 58
See application file for complete search history.

(56) References Cited

U.S. PATENT DOCUMENTS

| | | | | |
|---|---|---|---|---|
| 3,575,497 A | * | 4/1971 | Leblanc | G02C 7/10 351/47 |
| 5,100,224 A | * | 3/1992 | Terrasi | G02C 9/02 351/47 |
| 2011/0234970 A1 | * | 9/2011 | Wu | G02C 9/04 351/57 |

* cited by examiner

*Primary Examiner* — Hung X Dang
(74) *Attorney, Agent, or Firm* — Studebaker & Brackett PC

(57) ABSTRACT

Clip-on sunglasses for plastic eyeglass frames are shaped more like a bracket, with a nearly 90° bend to accommodate the thickness of plastic eyeglass frames. The ends of the bracket also angle for 45° towards each other to avoid hitting the nose piece of the plastic eyeglass frame. In the clip-on sunglasses, a latch controls two arms to rotate the arms up to a 45° angle with respect to a pair of plastic eyeglass frames. The arms are formed in three bent portions so as to extend away from an interconnecting rod portion. The three bent portions of the arms allows the latch to fit the shape of the plastic eyeglass frame along the bridge portion of the eyeglass frame as effectively as possible and minimizes movement of the clip-on sunglasses relative to the eyeglass frame.

8 Claims, 3 Drawing Sheets

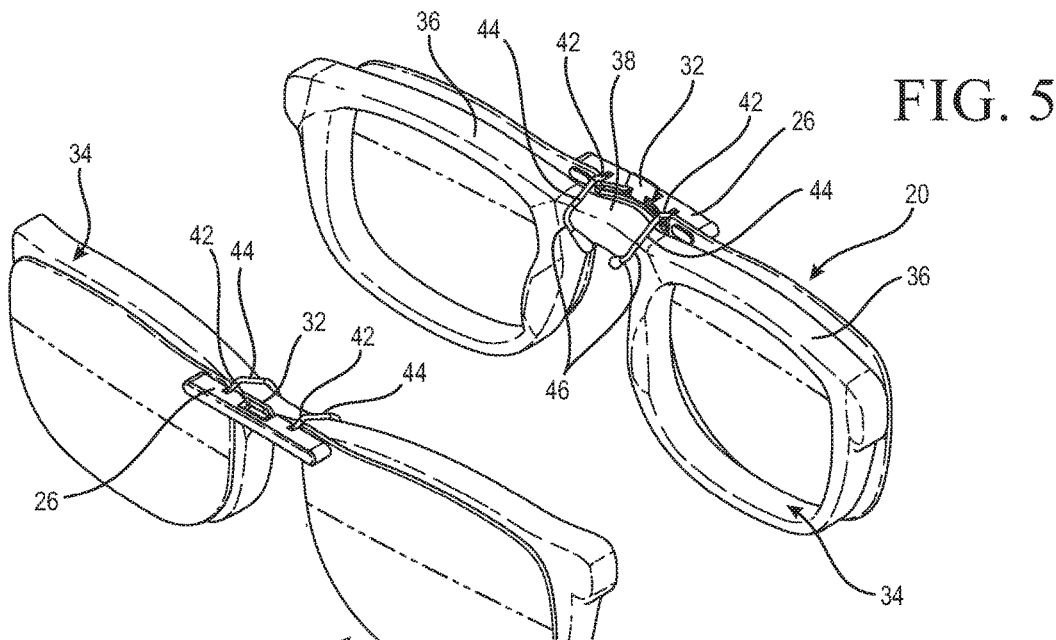
FIG. 5
FIG. 6
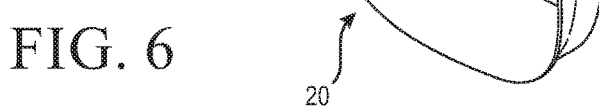
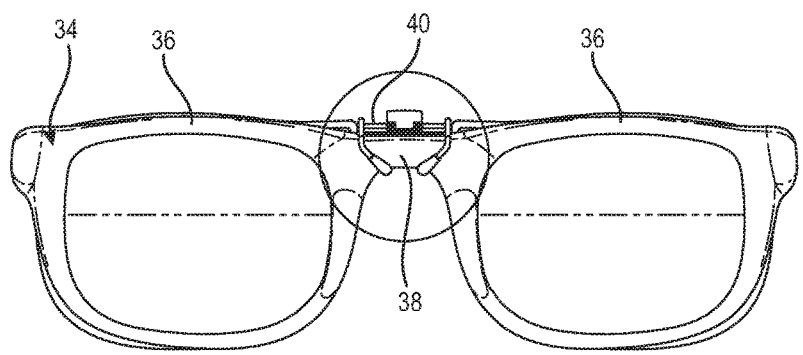
FIG. 7
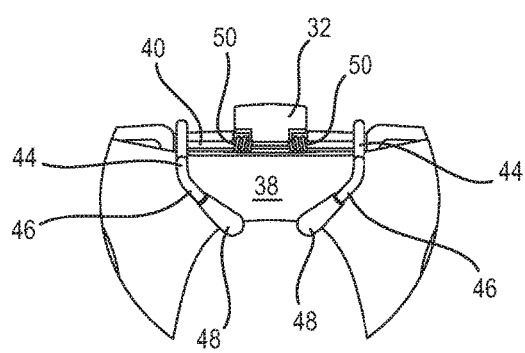
FIG. 8

CLIP-ON SUNGLASSES

This application claims priority to U.S. Provisional Patent Application No. 62/417,871 filed Nov. 4, 2016, the entire content of which is incorporated by reference.

FIELD OF THE INVENTION

The present invention relates to the field of clip-on sunglasses, as used in conjunction with plastic framed eyeglasses.

BACKGROUND OF THE INVENTION

One of the features of clip-on sunglasses is the size and angle difference for use in conjunction with metal versus plastic eyeglass frames. With metal frames of eyeglasses, nose pieces are low enough and thin enough where they are not in the way of the clips extending from a bar portion of a pair of clip-on sunglasses. However, with plastic frames of eyeglasses, the plastic frames are not only thicker to maintain their integrity, but the nose pieces on plastic frames are located much higher than in metal frame eyeglasses. Further, the bridge portion of plastic frame eyeglasses may get in the way of most clip-on sunglasses.

SUMMARY OF THE INVENTION

The clip-on sunglasses of the present invention are shaped more like a three sectioned bracket, with an initial nearly 90° bend to accommodate the thickness of the plastic eyeglass frames. The ends of the bracket also angle for 45° towards each other to avoid hitting the nose piece of the plastic eyeglass frame.

In the clip-on sunglasses of the present invention, a latch sitting in a recessed portion controls two arms to rotate the arms up to a 45° angle with respect to a pair of plastic eyeglass frames. The two arms are formed in three portions so as to extend away from an interconnecting rod portion. The three portions of the two arms allows the latch to fit the shape of the plastic eyeglass frame along the bridge portion of the eyeglass frame as effectively as possible and minimizes movement of the clip-on sunglasses relative to the eyeglass frame. This provides an optimized grip on the plastic eyeglass frame.

A separation distance between the ends of the two arms may be in a range of 10 to 14 mm, a sufficient distance to allow correct attachment of the clip-on sunglasses to a plastic eyeglass frame. The ends of the two arms are protected by PVC end caps which are used to grip the nose bridge portion of the plastic eyeglass frame.

Interconnecting the two arms of the clip-on assembly is a straight bar portion onto which two springs and the latch are mounted. Straight bar portion passes through the latch within a recess so as to control the pivoting motion of the two arms. A free end of the springs is captured within the bar portion of the clip-on assembly.

The three portions of each arm are formed by a series of bends. The first portion emanates from the straight bar portion at an angle of approximately 90°. The second successive portion bends down from the first portion at an angle of approximately 141°. The final and third portion of the arm bends downwardly and inwardly towards the other arm at an angle of approximately 104° with respect to the second portion. The three bent portions have not heretofore been found in clip-on sunglasses as the clip-on sunglasses of the present invention are specifically made to accommodate the unique configuration of a pair of plastic eyeglass frames.

It is therefore an object of the present invention to provide a pair of clip-on sunglasses to a plastic eyeglass frame.

It is therefore another object of the present invention to provide a pair of clip-on sunglasses to a plastic eyeglass frame with a pair of arms extending from a bar portion so as to grip a bridge portion of the plastic eyeglass frame.

It is therefore still yet another object of the present invention to provide a pair of clip-on sunglasses to a plastic eyeglass frame with a pair of arms extending from a bar portion so as to grip a bridge portion of the plastic eyeglass frame with the pair of arms including three bent portions.

It is therefore a further object of the present invention to provide a pair of clip-on sunglasses to a plastic eyeglass frame with a pair of arms extending from a bar portion so as to grip a bridge portion of the plastic eyeglass frame with the pair of arms including three bent portions, the three bent portions being successively angled with respect to each other at angles of approximately 90°, 141° and 104°, respectively.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

FIG. 5 illustrates a rear perspective view of the clip-on sunglasses of the present invention mounted onto a plastic eye glass frame.

FIG. 6 is a front perspective view thereof.

FIG. 7 is a rear view thereof.

FIG. 8 is an enlarged view of the area encircled in FIG. 7.

DETAILED DESCRIPTION OF THE PREFERRED EMBODIMENTS

Figure 1:
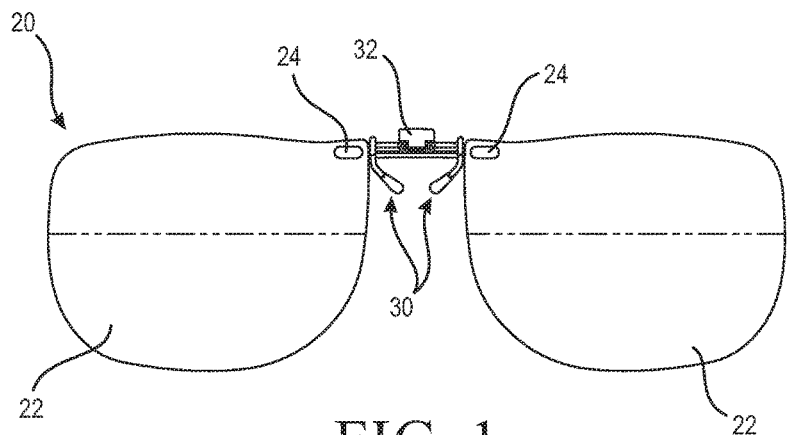
FIG. 1 is a rear view of the clip-on sunglasses of the present invention.
Figure 3:
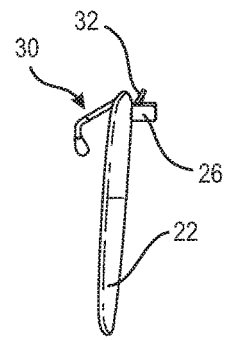
FIG. 3 is a side view thereof.
Figure 2:
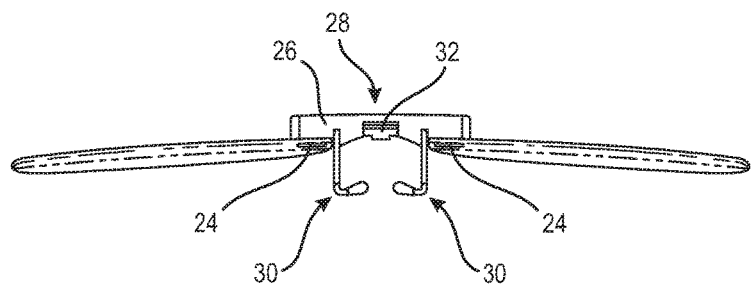
FIG. 2 is a top view thereof.
Figure 4:
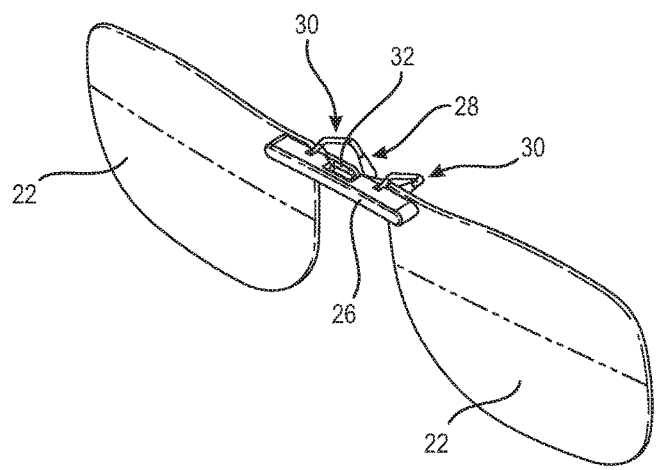
FIG. 4 is a front perspective view thereof.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The clip-on sunglasses of the present invention are generally shown in FIG. 1 through 4 by reference numeral 20. In these figures, two lens portions 22 are secured by rivets 24 to a bar portion 26. The bar portion 26 forms part of a clip-on assembly 28.

The clip-on assembly 28, in addition to the bar portion 26, includes two arms 30 for engaging a bridge portion of a plastic eyeglass frame. The nose bridge portion 38 of the plastic eyeglass frame has a thickness of 1 mm to 6 mm. By pivotal movement of a latch 32, the arms 30 are caused to move through an angle as large as approximately 45° to grip the nose bridge portion 38 of the plastic eyeglass frame.

As shown in more detail in FIGS. 5 through 8, the clip-on sunglasses 20 are shown mounted onto a plastic eyeglass frame 34. It is important to note that the clip-on sunglasses 20 of the present invention are specifically designed for engagement with plastic eyeglass frames because of the specific characteristics of these type of frames.

In plastic eyeglass frames, as perhaps best shown in FIGS. 5 and 6, the lens holding portions 36 and particularly the interconnecting bridge portion 38 are of a particularly large thickness so as to provide the strength and integrity of use as an eyeglass frame. This is significantly contrasted with metal eyeglass frames which due to the strength of the metal, are significantly less thick than a plastic eyeglass frame.

Therefore, to accommodate plastic eyeglass frames, the clip-on sunglasses of the present invention require significant deviation from clip-on sunglasses typically used with metal eyeglass frames. This is particularly true with respect to the two arms 30 of the present invention. Each of these arms includes three bent portions extending from a central rod portion 40 which interconnects the two arms at opposite ends of the central rod portion 40.

With reference to FIGS. 5 and 6, a first bent portion 42 extends from the central rod portion 40. Successively, a second bent portion 44 extends from the first bent portion 42. Finally, a third bent portion 46 terminates in a PVC endcap 48.

Located between the two arms 30, on the central rod portion 40 are at least one spring 50. In FIG. 8, two springs 50 are shown located on central rod portion 40, on opposite sides of the latch 32. The latch is engaged by the finger of a user to pivot the two arms 30 against the bias of the springs 50.

The details of the arms 30 will be shown and described with reference to FIGS. 9 through 13. In these figures, the specific angles of inclination of the various bent portions of the arms with respect to each other are shown.

Figure 9:
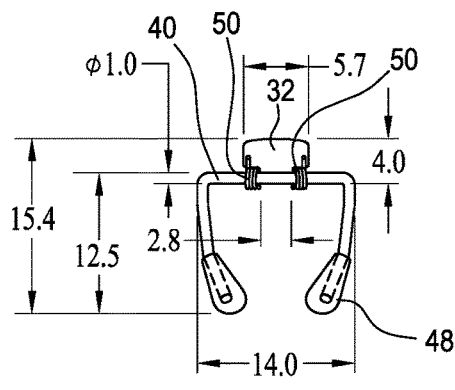
FIG. 9 is a detailed front view of the two arm portions interconnected by a straight rod portion, with the straight rod portion extending through two springs.
Figure 10:
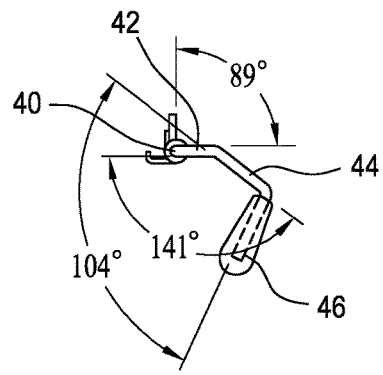
FIG. 10 is a side view thereof illustrating the angles between the three bent portions of the arms.
Figure 11:
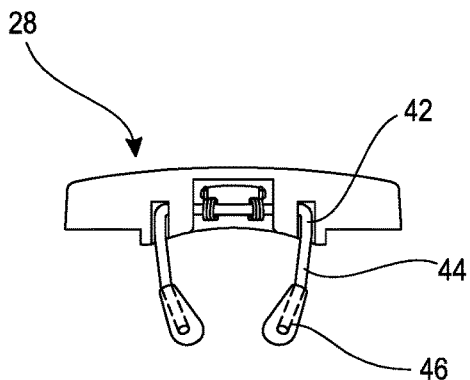
FIG. 11 is a detailed view of the assembly of the bar portion with the straight rod portion extending through the bar portion and the two arm portions projecting from the bar portion.
Figure 12:
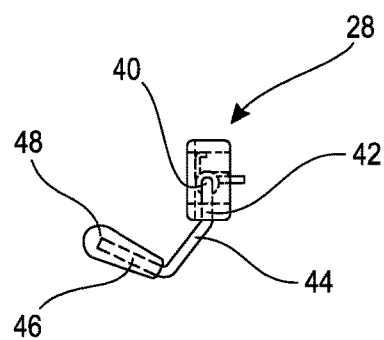
FIG. 12 is a side view thereof illustrating the latch connected to the straight rod portion.

For example, in FIGS. 9 and 10, the first bent portion 42 as shown in FIG. 10, extends away from central rod portion 40 by an angle of 89°. The second bent portion 44 is bent with respect to the first bent portion 42 at an angle of 141°. The third end portion 46 is bent with respect to the second bent portion 44 at an angle of 104°.

In addition, the length and separation distances between the various bent portions are also critical. In FIG. 9, a 1 mm diameter stainless steel central rod portion 40 is shown extending for 14 mm. The separation distance of outermost portions of the two springs 50 on the central rod portion is 5.7 mm and the separation distance of the innermost portions of the two springs 50 is 2.8 mm. The latch 32 secured to the rod portion 40 has a width of 5.7 mm and a height of 4 mm.

An overall distance from the top of the latch 32 to the tip of the endcap 48 is 15.4 mm while the distance from the rod portion 42 to the tip of the endcap 48 is 12.5 mm.

Figure 13:
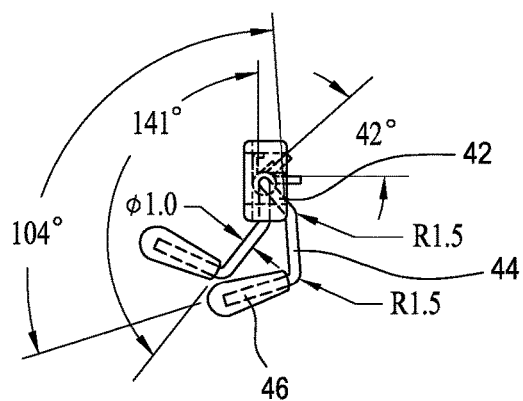
FIG. 13 illustrates the range of motion of the arms with respect to the bar portion and the angles of the bent portions necessary so as to securely grip the bridge of a pair of plastic eyeglass frames.

The gripping portion of the assembly 30, as provided by the endcaps 48, is movable from a closed position at 0° and a fully open position of 42° so as to clip onto the nose bridge portion of a plastic eyeglass frame. This is shown in FIG. 13. It is to be noted that the endcaps 48 and therefore the third bent portions converge towards each other as they bend inwardly and downwardly.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A clip-on sunglass for a plastic frame eyeglass, said clip-on sunglass comprising:
    two sunglass lenses,
    a bar portion interconnecting the two sunglass lenses,
    a clip assembly, said clip assembly being mounted in said bar portion,
    said clip assembly including a rod portion terminating in two arms, said two arms being located at opposite ends of said rod portion, and
    a central portion of said rod portion including a latch and at least one spring, said latch providing pivotal movement of said two arms with respect to said bar portion for engaging a bridge of the plastic frame eyeglasses,
    said two arms each including three bent portions extending from said rod portion,
    the three bent portions include a first bent portion extending forwardly from the rod portion at an angle of approximately 90° from the rod portion,
    a second bent portion of the three bent portions extending forwardly and downwardly from the first bent portion at an angle of approximately 140° from said first bent portion,
    a third bent portion of the three heat options extending downwardly and laterally inwardly from the second bent portion at an angle of approximately 105° from said second bent portion,
    said third bent portion of each of the two arms extending centrally to converge towards each other.

2. The clip-on sunglass for a plastic frame eyeglass according to claim 1, wherein the rod portion is pivotally mounted in said bar portion.

3. The clip-on sunglass for a plastic frame eyeglass according to claim 1, wherein said third bent portion terminates in an end cap.

4. The clip-on sunglass for a plastic frame eyeglass according to claim 1, wherein said clip assembly is mounted between the two sunglass lenses.

5. The clip-on sunglass for a plastic frame eyeglass according to claim 4, wherein said latch is mounted to move against a bias of said at least one spring.

6. The clip-on sunglass for a plastic frame eyeglass according to claim 1, wherein said latch and said at least one spring are mounted in a recess defined in said bar portion.

7. The clip-on sunglass for a plastic frame eyeglass according to claim 1, wherein the latch provides movement of the two arms through an angle of approximately 45°.

8. The clip-on sunglass for a plastic frame eyeglass according to claim 1, wherein free ends of the two arms at the third bent portion are separated from each other by a distance of 14 mm.

* * * * *